United States Patent [19]

Matros et al.

[11] Patent Number: 5,451,300
[45] Date of Patent: Sep. 19, 1995

[54] PROCESS FOR STRIPPING A VOLATILE COMPONENT FROM A LIQUID

[75] Inventors: Yurii S. Matros, St. Louis; David E. McCombs, Chesterfield, both of Mo.

[73] Assignee: Monsanto Company, St. Louis, Mo.

[21] Appl. No.: 69,872

[22] Filed: Jun. 1, 1993

[51] Int. Cl.6 .................. B01D 3/42; C02F 1/20
[52] U.S. Cl. ......................... 203/2; 203/10;
203/22; 203/29; 203/31; 203/49; 203/100;
203/DIG. 6; 203/DIG. 8; 95/254; 95/256;
95/263; 202/159; 202/160; 202/182; 210/750;
210/758; 210/763; 210/766; 422/187; 422/198;
423/245.3
[58] Field of Search .............. 203/49, 31, 22, 25,
203/27, DIG. 8, DIG. 6, 28, 29, 10; 202/159,
234, 160, 182; 210/763, 766, 750, 758, 180, 181;
423/245.3; 95/263, 254, 256; 422/187, 198

[56] References Cited

U.S. PATENT DOCUMENTS

| | | | |
|---|---|---|---|
| 3,642,583 | 2/1972 | Greenberg et al. | 203/31 |
| 3,912,598 | 10/1975 | Dick | 210/763 |
| 4,702,892 | 10/1987 | Betz | 34/79 |
| 4,713,089 | 12/1987 | Robbins | 55/52 |
| 4,846,934 | 7/1989 | Carberry | 202/177 |
| 4,877,592 | 10/1989 | Matros et al. | 423/245.1 |
| 4,892,664 | 1/1990 | Miller | 210/747 |
| 4,906,338 | 3/1990 | DeLoach | 203/10 |
| 4,983,364 | 1/1991 | Buck et al. | 422/189 |
| 5,176,798 | 1/1993 | Rodden | 202/159 |
| 5,183,563 | 2/1993 | Rodden | 210/180 |
| 5,190,668 | 3/1993 | Chuang | 210/750 |
| 5,259,931 | 11/1993 | Fox | 203/49 |

FOREIGN PATENT DOCUMENTS

1160201 7/1985 U.S.S.R. .

OTHER PUBLICATIONS

Friday et al., "Selection of Treatment Process to Meet OCPSF Limitations,": Environmental Progress, vol. 10, No. 9, pp. 218–224 (Aug. 1981).

Primary Examiner—Wilbur Bascomb, Jr.
Attorney, Agent, or Firm—Senniger, Powers, Leavitt & Roedel

[57] ABSTRACT

A process and apparatus for stripping a volatile component from a liquid. The volatile component is destroyed by exothermic reaction with an active component in the gas phase, typically over a catalyst. Heat generated by the reaction of the volatile and active components is transferred to a fluid contact zone in which the organic component is stripped from the liquid stream by a stripping gas. Transfer of heat to the fluid contact zone increases the equilibrium partial pressure of the volatile component in the gas phase and thus increases the driving force for mass transfer in the stripping operation. Preferably, the volatile component is reacted with the active component in a regenerative heat transfer reaction system.

20 Claims, 4 Drawing Sheets

PROCESS FOR STRIPPING A VOLATILE COMPONENT FROM A LIQUID

BACKGROUND OF THE INVENTION

This invention relates to the removal of volatile components from a liquid stream by contact with a stripping gas, and more particularly to an improved process for removal of volatile organic components from an aqueous liquid by stripping with air or another oxygen containing gas.

Aqueous waste streams from various commercial and industrial processes are contaminated with volatile organic components. Removal of such organic components is necessary or desirable in order to meet water pollution standards. One method of removal is to strip the volatile organic component from the aqueous waste stream by contact with air, for example, in a packed stripping tower in which the air flows countercurrently to the aqueous liquid. This system is effective for removal of volatile organics such as benzene, toluene, ketones, ethers, phenol, naphthalene, acrylonitrile, oil, light petroleum fractions, and the like. So that a water pollution problem is not converted to an air emissions problem, the volatile organics are preferably burned before the effluent gas stream from the stripping tower is discharged into the atmosphere.

Since the concentration of a volatile organic contaminant in the effluent gas from the stripper is typically below flammable limits, fuel from independent sources may be burned to generate temperatures high enough for the contaminant to be consumed. These systems operate at elevated temperatures in excess of 1000° C. Alternatively, and preferably in most cases, catalysts are used which cause the organic contaminants to be oxidized by combustion at low concentrations and low temperatures, for example, 300°–700° C., often without supply of supplemental fuels.

Preferably, the contaminated gases are preheated before being fed to either a thermal or catalytic combustion chamber. For thermal efficiency, the gases are advantageously preheated by transfer of heat from the combustion gas produced by burning the contaminants. In the case of industrial or commercial process vent streams containing organic contaminants, it is known in the art to use a regenerative heat transfer system to preheat the entering gas by recovery of combustion heat. In such a system, the contaminated gas is passed in series through a regenerative heat exchange zone, a combustion zone, and another regenerative heat exchange zone. Each heat exchange zone contains a heat storage material to which heat is transferred when the combustion gas is flowing through that zone; and flow through the system is periodically reversed. In each cycle, heat is recovered from the combustion gas by transfer to the heat storage material in the heat exchange zone downstream of the combustion zone, and the entering gas is preheated in the heat exchange zone upstream of the combustion zone by transfer of heat that had been absorbed from the combustion gas in the previous cycle. The point of cycle reversal may be dictated by attainment of a maximum acceptable temperature in the downstream heat exchange zone or a minimum acceptable temperature in the upstream zone. Destruction of volatile organic contaminants in oxygen-containing vent gases is described, for example, in Friday et al., "Selection of Treatment Process to Meet OCPSF Limitations," *Environmental Progress*, Vol. 10, no. 9 (August 1981), pp. 218–224. A regenerative heat transfer reaction process for destruction of organic contaminants which uses catalytic oxidation is described in U.S. Pat. No. 4,877,592.

Where ambient air is used for stripping contaminated aqueous streams that are also at ambient temperature, the equilibrium partial pressure of the organic contaminants in the gas phase may be low. If so, the concentration of organic contaminants in the effluent gas is correspondingly low, and a high gas flow rate may be necessary for effective stripping of the organic contaminant from the liquid. This translates into high capital and operating costs for the stripping tower and the blower which moves air through the tower.

Matros, *Catalytic Process under Unsteady-State*, (Elsevier Science Publishers, Amsterdam, Netherlands 1989) describes a regenerative heat transfer reaction system for combustion of organic components in an oxygen-containing gas stream, in which a portion of the heat of reaction is recovered in the form of high potential energy, such as high pressure steam. In this system, a portion of the reaction gas is diverted from the system and passed through an energy recovery device such as, for example, a waste heat boiler. The reaction gas leaving the boiler is returned to the reaction zone or to the regenerative heat exchange zone downstream of the reaction zone. In such a system, the generation of high potential energy is realized at the partial expense of preheating the gas entering the reaction zone. If the recoverable reaction energy substantially exceeds what is required to preheat the effluent stripping gas containing the volatile organic component to the temperature necessary to initiate the oxidation reaction, the system of the Matros article provides a salutary means for recovering the excess energy in useful form. However, the Matros article system does not deal with the problem of promoting mass transfer from the liquid to the stripping gas in the liquid stripper where the equilibrium partial pressure of the organic contaminant is low.

SUMMARY OF THE INVENTION

Among the several objects of the present invention, therefore, may be noted the provision of an improved process for removing organic contaminants from aqueous streams, or generally for the removal of volatile components from liquid streams, by contact with a stripping gas; the provision of such a process in which the volatile component is destroyed in the effluent gas from the stripper; the provision of such a process where the volatile component is destroyed by reaction with an active component contained in the effluent gas from the stripper; the provision of such a process which can be carried out economically, with modest capital and operating costs; the provision of such a process which can be operated at high mass transfer rates; the provision of such a process which is effective for stripping components that have a relatively low equilibrium partial pressure in the gas phase under ambient conditions; the provision of such a process which can be operated at relatively low gas flow and pressure drop; the provision of such a process which may be operated without high rates of discharge of stripping gases to the surroundings; and the provision of apparatus for use in such a process.

Briefly, therefore, the present invention is directed to a process for removing a volatile component from a liquid stream. In the process, the liquid stream is contacted in a fluid contact zone with a stripping gas, thereby stripping the volatile component from the liquid stream and producing an effluent gas stream containing a vapor comprising the volatile component. The effluent gas stream is introduced into a reaction zone and, in the reaction zone, the volatile component is reacted with an active component that is exothermically reactive with the volatile component in the gas phase to produce a reaction gas. The process is characterized in that heat is transferred from the reaction gas to the contact zone. The transfer of heat to the contact zone is effective to increase the equilibrium partial pressure of the volatile component in the gas phase in the contact zone and thereby increase the driving force for mass transfer of the volatile component from the liquid stream to the stripping gas.

The invention is particularly directed to a process for the above-described type in which a volatile organic component is stripped from aqueous stream to produce an effluent gas that is introduced into a reaction zone where the volatile component is reacted with oxygen in the gas phase to produce an oxidized gas, typically a combustion gas.

The invention is further directed to an apparatus for stripping a volatile component from the liquid stream. The apparatus comprises a fluid contact zone having an inlet for stripping gas, an outlet for an effluent gas containing the volatile component, an inlet for the liquid stream and a liquid outlet. Within the fluid contact zone is means for promoting mass transfer between the stripping gas and the liquid stream. The apparatus further comprises a reaction zone for gas phase exothermic reaction between the volatile component and an active component of the effluent gas to produce a reaction gas, and means for mass transfer of heat from the reaction gas to the fluid contact zone.

The invention is also directed to a process for removing a volatile component from a liquid stream in which the liquid stream is contacted in a fluid contact zone with a stripping gas, thereby stripping the volatile component from the aqueous stream and producing an effluent gas stream containing a vapor comprising the volatile component. The stripping gas and the effluent gas further contain an active component that is potentially exothermically reactive with the volatile component in the gas phase. The conditions in the contact zone are insufficient to activate the reaction between the components. The effluent gas is introduced into a reaction zone and the volatile component and active component of the effluent gas are reacted in the reaction zone to produce a reaction gas. The process is characterized in that the active component is reacted with the volatile component in a reaction zone of a regenerative heat transfer reaction system in which heat is recovered by regenerative heat exchange and used to heat the effluent stream from the contact zone before it enters the reaction zone. The system comprises the reaction zone and at least two regenerative heat exchange zones, in one of which regenerative heat exchange zones the reaction product gas exiting the reaction zone is passed over a heat storage material which absorbs heat transferred from the reaction gas. In the other of the heat exchange zones, the effluent gas stream from the fluid contact zone is passed over a heat storage material from which heat is transferred to the effluent gas stream before the latter stream enters the reaction zone. The flow of gas is periodically reversed through a continuing series of cycles so that heat that has been absorbed from the reaction gas is used to preheat the effluent gas entering the reaction zone.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
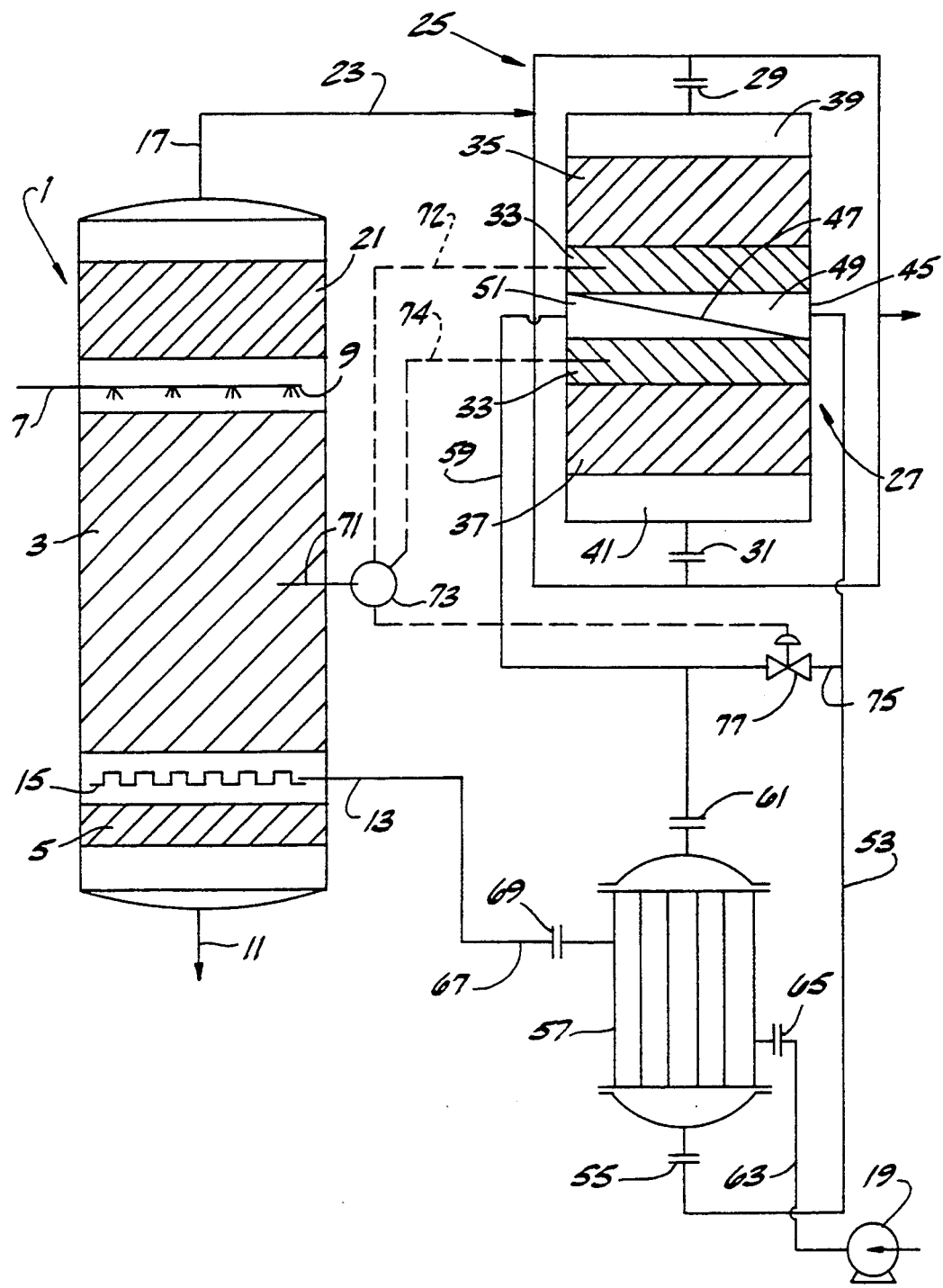
FIG. 1 is a flow sheet illustrating a preferred embodiment of the invention in which the heat of combustion of a volatile organic contaminant is used to preheat air used for stripping the organic contaminant from an aqueous stream.

In the accordance with the process of the invention, the efficiency of a process for stripping volatile organic contaminants from an aqueous stream is enhanced by transferring heat to the gas/liquid contact zone from a combustion zone in which the organic contaminants are destroyed. Gas/liquid contact is advantageously carried out in a packed tower through which the gas and liquid are passed in countercurrent flow. Transfer of combustion heat to the gas/liquid contact zone is conveniently accomplished by indirect heat exchange between the combustion gas and either the air (stripping gas) or contaminated aqueous stream entering the stripper. Alternatively, at least a portion of the combustion gas may be used as the stripping gas, in which case heat is transferred by direct contact from combustion gas to the liquid stream in the fluid contact zone. Transfer of heat to the contact zone increases the equilibrium partial pressure of the organic contaminant in the gas phase within the contact zone. This increases the driving force for mass transfer and, thus, increases the actual partial pressure and weight fraction of the volatile organic component in the effluent gas from the stripper. Consequently, a lower volume of stripping gas is required per unit weight of organic contaminant removed from the aqueous stream. This in turn reduces the pressure drop through a stripping column of given size, allowing a reduction in the tower diameter necessary to avoid flooding or excessive entrainment. Because of the enhanced driving force for mass transfer, it may also be feasible to operate the process of the invention using a tower of lesser height than that required for stripping aqueous liquid at ambient temperature with ambient air. Capital and operating costs are also reduced by the lesser requirement of air per unit of organic contaminant removed.

Although particularly adapted for removal of organic contaminants from aqueous streams by stripping with air, the process and apparatus of the invention are effective generally for the removal of volatile components from liquid streams where the volatile component is exothermically reactive with an active component in the gas phase. The active component is either present in the stripping gas or is introduced into the effluent gas from the stripper before the effluent gas is introduced into the reaction zone where reaction between the volatile component and the active component takes place. Where the stripping gas contains the active component, for example, where organics are stripped with air, conditions are maintained in the fluid contact zone which are insufficient to activate self sustaining reaction between the volatile component and the active component. The effluent gas from the stripper is directed to a separate reaction zone where the reaction takes place. Heat is then transferred from the reaction gas to the fluid contact zone by indirect heat transfer from the reaction gas to either the liquid stream or the stripping gas, or alternatively by direct contact between the liquid stream and a portion of the reaction gas which serves as the stripping gas.

Preferably, reaction of the active and volatile components of the effluent gas is conducted in a regenerative heat transfer reaction system. Reaction gas removed from that system is either used as the stripping gas or passed through an indirect heat exchanger where heat is transferred to the fluid contact zone of the stripper. In the latter case, one of the contacting fluids is preferably routed through the heat exchanger before it enters the fluid contact zone. The reaction gas exiting the indirect heat exchanger is returned to the regenerative heat transfer reaction system.

A preferred apparatus for carrying out the process of the invention is shown in FIG. 1. A stripping tower 1 contains a fluid contact zone 3 comprising means for promoting gas/liquid mass transfer, preferably a bed of packing such as saddles, rings, or the like. Above contact zone 3 is a tower inlet 7 for liquid containing a volatile component and a spray head 9 or other liquid distributor for distribution of the liquid evenly over the packing. At the bottom of the tower is a defrothing zone 5 and an outlet 11 for stripped liquid, and on the side of the tower below contact zone 3 is an inlet 13 for stripping gas. Gas inlet 13 connects to a gas distributor 15 which distributes the gas evenly before it enters the packing. At the top of the tower is an outlet 17 for stripping gas. Between spray head 9 and the top of the tower is a mist elimination zone 21 containing metal mesh, fiber glass cartridges or other means for collecting liquid that may be entrained in the effluent gas.

An effluent gas line 23 connects tower gas outlet 17 to the gas distribution circuit 25 of an regenerative heat transfer reaction system for exothermic gas phase reaction of the volatile and active components of the effluent gas. The regenerative heat transfer reaction system comprises a vertical reactor vessel 27 which has an upper nozzle 29 and a lower nozzle 31 for alternating inlet of contaminated gas and exit of combustion gas. Within vessel 27 is a combustion zone 33. Preferably, the reaction is catalyzed, in which instance combustion zone 33 preferably comprises a fixed catalyst bed containing a noble metal or metal oxide catalyst. The catalyst may be supported on a ceramic support in any of various forms suitable for gas/solid contact, including saddles, rings, pellets, etc. Above and in gas flow communication with reaction (combustion) zone 33 within vessel 27 is a regenerative heat exchange zone 35 comprising a bed of inert heat absorption and storage material such as ceramic, stoneware, rocks or pebbles, which may be of any suitable shape such as saddles, spheres, cylinders or Raschig rings. Below and in gas flow communication with combustion zone 33 is another regenerative heat exchange zone 37 comprising a bed of heat absorption and storage material of the same character as that of zone 35. Between heat exchange zone 35 and nozzle 29 is a distribution/collection zone 39, and between heat exchange zone 37 and nozzle 31 is a distribution/collection zone 41. Valving (not shown) may be arranged to feed the contaminated gas stream into combustion zone 33 through nozzle 29, distribution zone 39 and heat exchange zone 35, and withdraw a combustion gas stream through heat exchange zone 37, collection zone 41, and nozzle 31; or to feed contaminated gas through zones 41 and 37 and withdraw combustion gas through zones 35 and 39. The valves are periodically operated to reverse the direction of flow through the system. Contaminated gas is drawn into the system and combustion gas discharged by a blower 19.

Within reaction or combustion zone 33 is a reaction gas removal zone 45 having a diagonal partition 47 which divides zone 45 into a withdrawal/return compartment 49 in direct fluid flow communication with heat exchange zone 35 via the upper portion of reaction zone 33, and a withdrawal/return compartment 51 in direct fluid flow communication with heat exchange zone 37 via the lower portion of the reaction zone. A gas line 53 connects compartment 49 to an inlet/exit nozzle 55 on the tube side of a shell and tube heat exchanger 57, and a gas line 59 connects compartment 51 to an inlet/exit nozzle 61 on the tube side of exchanger 57 at the end opposite from nozzle 55. Both compartments are in communication with the tube side of the heat exchanger through nozzles 55 and 61.

Air or other stripping gas is supplied by a blower 19 through a gas line 63 to an inlet nozzle 65 on the shell side of heat exchanger 57. A gas line 67 connects a gas outlet nozzle 69 on the shell of the heat exchanger with inlet 13 of stripper 1.

A thermocouple 71 in contact zone 3 measures the temperature in the contact zone and thermocouples 72 and 74 in the reaction zone measures the temperature there. All of the thermocouples communicate with a temperature controller 73. A bypass line 75 connects gas lines 53 and 59 allowing reaction gas flowing between compartments 49 and 51 to bypass heat exchanger 57. A control valve 77 in line 75, operating in response to signals from controller 73, controls the rate at which reaction gas flows through the line 75 and bypasses heat exchanger 57. Depending on the nature of the system, controller 73 may operate regulate the flow rate through valve 77 to control the temperature in the reaction zone, as measured by thermocouples 72 and 74, or the temperature in the fluid contact zone, as measured by thermocouple 71.

In accordance with the process of the invention for removal of a volatile organic component from an aqueous stream, the aqueous stream flows through liquid inlet 7 of tower 1 and is introduced into fluid contact zone 3 through spray head 9. Air from blower 19 flows through line 63, heat exchanger 57, line 67 and inlet 13 into tower 1, where it is introduced into the fluid contact zone through gas distributor 15. Serving as the stripping gas, the air contacts the aqueous stream in contact zone 3, causing volatile organic contaminants in the aqueous stream to be vaporized and transferred to the gas phase. Effluent gas exiting the top of contact zone 3 contains oxygen and a vapor comprising the organic contaminant. Conditions maintained in the contact zone are not sufficient to activate combustion of the organic contaminant with oxygen in the effluent gas. The temperature is far below the auto ignition temperature of the air/organic mixture and the concentration of organic component in the stream is typically (though not necessarily) below the flammability limit.

Gas leaving the contact zone passes through mist elimination zone 21 and then through gas line 23 to the regenerative heat transfer reaction system. Gas entering the reaction system through gas circuit 25 is preheated by transfer of heat from the heat absorption and storage material in the heat exchange zone (35, 37) upstream of the catalyst zone and combustion heat is transferred to the heat absorption and storage material in the heat exchange zone (37, 35) downstream of the combustion zone. Operation during each cycle is non-steady state with respect to temperature, the heat storage material in the preheat zone being progressively cooled by transfer of heat to incoming gas, and the heat storage material in the heat recovery zone being progressively heated by transfer of heat from the combustion gas exiting the combustion zone. When the temperature in the heat recovery zone or collection zone rises to a predetermined level, or the temperature in the preheat zone falls to a predetermined level, the direction of flow through the system is reversed. In this regard, the process is conventional and the means for measuring the temperatures on which flow reversal is based are not shown.

During passage through reaction zone 33, the reaction gas enters compartment (49, 51) and is directed by line (53, 55) to the tube side of heat exchanger 57. There heat is transferred from the reaction gas to the stripping gas (air) flowing through the shell side of the exchanger. Preheating the air increases the temperature of the contact zone into which the air is introduced. The rate of heat transfer to the contact zone is regulated to control the temperature in either the reaction zone, as measured by thermocouple 72 and/or 74, or in the fluid contact zone, as measured by thermocouple 71. In many systems, recovery of the heat generated by combustion of the organic contaminant is either insufficient or barely sufficient to raise the effluent gas to the autothermal ignition temperature in the reaction zone. In these systems, additional heat may be supplied by supplying another fuel for the reaction, typically by introduction into line 23 or directly into reaction zone 33. Preferably, the flow rate of combustion gas removed from the reaction zone is greater than that required for transfer of heat at the regulated rate. Temperature control is, therefore, effected by bypassing a controlled portion of recovered gas around the heat exchanger through control valve 77 and directing the bypassed portion back to the reaction zone. Where recovered combustion heat is insufficient or only marginally sufficient to preheat the effluent gas to combustion temperature, the rate at which combustion gas is bypassed through valve 77 is preferably governed by the temperature at thermocouples 72 and 74. Thus, the control mode may be solely to maintain a selected minimum temperature in the reaction zone, or to override control of the temperature in the fluid contact zone to prevent the temperature in the reaction zone from falling too low. In systems where the organic contaminant concentration in the effluent gas is more than sufficient, upon combustion, to supply the energy necessary to heat that gas to combustion temperature, controller 73 may regulate valve 77 solely to control the temperature in the fluid contact zone, by controlling the rate of heat transfer to the air in the heat exchanger.

In response to the temperature measured in the reaction zone by thermocouples 72 and 74, or in the contact zone by thermocouple 71, controller 73 transmits a signal to the operator of valve 77. Where the control criterion is maintenance of a minimum temperature in reaction zone 33, a signal from the controller causes the valve to move toward a more open position to bypass an increased portion of combustion gas around the heat exchanger when the temperature sensed by the thermocouple falls below the set point of the controller, and causes the valve to move toward a more closed position to bypass a decreased portion of reaction gas around the heat exchanger when the temperature sensed by the thermocouple exceeds the set point of the controller. Thus, the rate of combustion gas directed to heat exchanger 57 for preheating stripping air is modulated to maintain temperature in the reaction zone at a desired minimum value. Where the control criterion is to maintain a minimum temperature in fluid contact zone 3, valve 77 is moved towards a more open position when the temperature measured by thermocouple 71 exceeds the set point, and to a more closed position when the measured temperature falls below the set point. Alternatively, thermocouple 71 may be located in gas line 67 and the temperature in contact zone 3 controlled by controlling the stripping gas temperature in line 67. Both the combustion gas bypassed through valve 77 and the combustion gas passing through heat exchanger 57 are returned to the regenerative heat transfer reaction system via compartment (49, 51) for further removal of heat therefrom in the regenerative heat exchanger downstream of the reaction zone.

As shown in FIG. 1, the system is arranged so that all of the reaction gas is removed from the system through one compartment of the removal zone and returned at the other, and the only reaction gas that bypasses the reactor is that passing through valve 77. Alternatively, the system may be set up in such a manner that only a portion of the gas may enter the removal zone and the remainder may flow directly between the upper and lower portions of the reaction zone. However, in either case, it is preferred that reaction gas be removed from and returned to the removal zone at a flow rate greater than that required for transfer of heat to the stripping gas at the regulated rate required to maintain the desired temperature value in reaction zone 33 or contact zone 3. This allows control of the temperature by controlling the bypass rate through valve 77 as described above.

As noted, providing heat to the contact zone by preheating the stripping gas entering that zone increases the temperature of the liquid stream and thus the partial pressure of the volatile component at equilibrium. This increases the driving force for mass transfer, resulting in an increase in the actual partial pressure and weight fraction of the volatile component in the effluent gas, correspondingly decreasing the stripping gas flow rate required to remove the volatile component from the liquid stream. As a consequence, gas velocities and pressure drop through the contact zone may be decreased for a tower of given diameter, allowing the use of a smaller diameter tower than would otherwise be possible without causing flooding or excessive entrainment of liquid in the effluent gas. Because of the increased driving force for mass transfer, the number or height of equilibrium transfer units may also be decreased, allowing the tower to be of lesser overall height. The use of a smaller stripping tower provides potentially significant savings in the capital cost of the stripping system.

Reduction in the air flow per unit weight of volatile component removed from the liquid also reduces the capital and operating cost of the blower which is required to move the stripping gas through the system. At constant pressure drop, the diameter of the catalyst bed and the heat exchange zones of the adiabatic regenerative reaction system may also be reduced. Moreover, since the concentration of volatiles in the effluent gas is higher, and the volume of inerts in the effluent gas correspondingly lower, less energy is required for preheating the gas entering the reaction zone, and a greater amount of energy is available for preheating the stripping gas entering the stripping tower. This allows further preheating of the stripping gas, which in turn provides a further increase in the driving force for mass transfer in the stripper. These effects in the reaction and stripping systems reinforce each other toward the attainment of progressively higher temperatures in both stripper and reactor, and higher volatile content of the effluent gas, until some constraint is reached. In a system for removal of organic contaminants with air and combustion of the contaminants with oxygen in the air, the constraint may be the aqueous liquid temperature that is reached in the stripper. In some systems, it may also be desirable to maintain the effluent gas composition below the flammability limit.

Unless pressure operation is contemplated, a condition that is ordinarily not economical, the operating temperature in the contact zone is ordinarily below 100° C., preferably below about 90° C., when the system is used for stripping a volatile component from an aqueous liquid. In this instance, a preferred range of operation of the contact zone is at a temperature of between about 30° C. and about 80° C., most preferably between about 40° C. and about 70° C. in the contact zone. Depending on the desired temperature in the contact zone and the L/G ratio suitable for the particular system, the desired temperature in the contact zone is typically achieved by heating the stripping air to a temperature in the range of between about 100° C. and about 200° C. before it enters the tower.

Where available energy would otherwise be sufficient to heat the contact zone to a temperature exceeding 100° C., that energy is preferably recovered in the form of high potential energy. Depending on the composition of the liquid feed stream and the consequent composition of the effluent gas stream, it may be feasible to recover high potential energy from the reaction gas, as described in the above-mentioned Matros article, while also preheating the stripping gas to maintain the fluid contact zone in the desired 30° to 70° C. range. Even though preheating consumes some of the heat that might otherwise be available for high potential energy recovery, the heat expended in preheating the stripping gas (or otherwise heating the fluid contact zone) may be more than offset by the heat saved by reducing the volume of inerts to be preheated in the preheat zone of the regenerative heat transfer reaction system. Where heat generation is sufficient to maintain the reaction zone at the requisite temperature while both heating the fluid contact zone to a desired temperature and generating high potential heat, the system may advantageously be controlled using the temperature measured by thermocouple 71 in the contact zone as the control variable.

Figure 2:
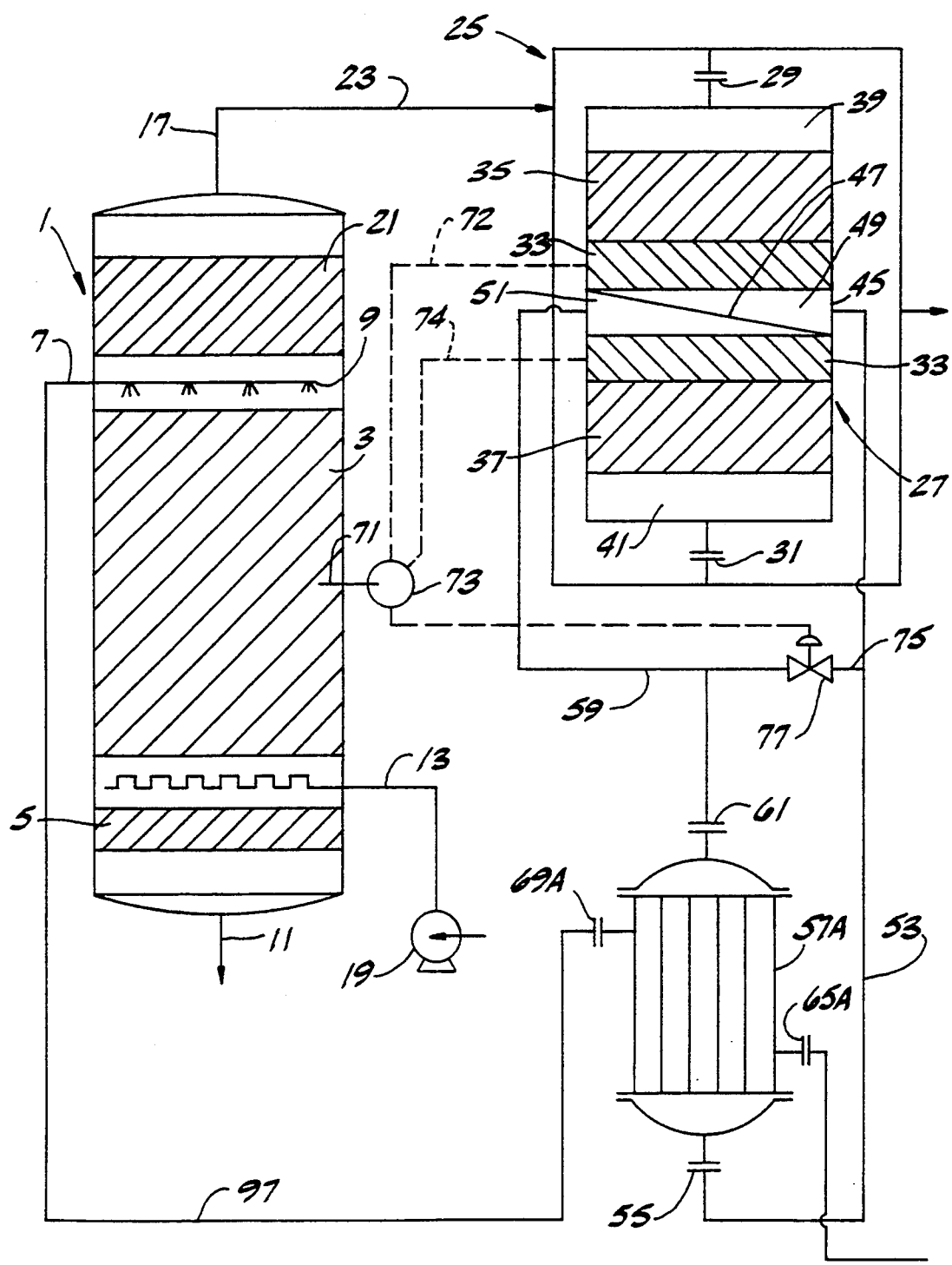
FIG. 2 is a flow sheet similar to that of FIG. 1 showing use of the heat of combustion to heat the aqueous stream to be stripped.

Illustrated in FIG. 2 is an alternative embodiment of the invention in which heat is transferred to the contact zone by indirect transfer of heat from the reaction gas to the liquid (rather than the gas) entering the contact zone. Thus, aqueous liquid is introduced into the shell side of a shell and tube heat exchanger 57A through line 65A while the reaction gas is introduced to the tube side of the exchanger through line 53 or 59. Liquid exiting heat exchanger 57A is introduced into inlet 7 through a liquid pipe line 97. Again, the temperature within contact zone 3 is measured by thermocouples 71 and/or 72 and 74, and controller 73 regulates the temperature at the location of the control thermocouple by controlling the position of valve 77 to increase or decrease the rate at which reaction gas is bypassed around exchanger 57A via valve 77. Where the rate of combustion heat generation is sufficiently high, it may be feasible to use the temperature measured in the fluid contact zone as the control variable. Alternatively, the temperature in the fluid contact zone may be controlled by controlling the liquid stream temperature in line 97. Because flowing liquid film heat transfer coefficients are generally higher than those for gas, the system of FIG. 2 may be constructed and operated using a heat exchanger having a smaller area than that of heat exchanger 57 of the system of FIG. 1. In a system for stripping organic contaminants from an aqueous waste stream, the aqueous stream is typically preheated to a temperature of between about 30° C. and about 100° C., preferably between about 40° C. and about 80° C., most preferably between about 50° C. and about 70° C.

Figure 3:
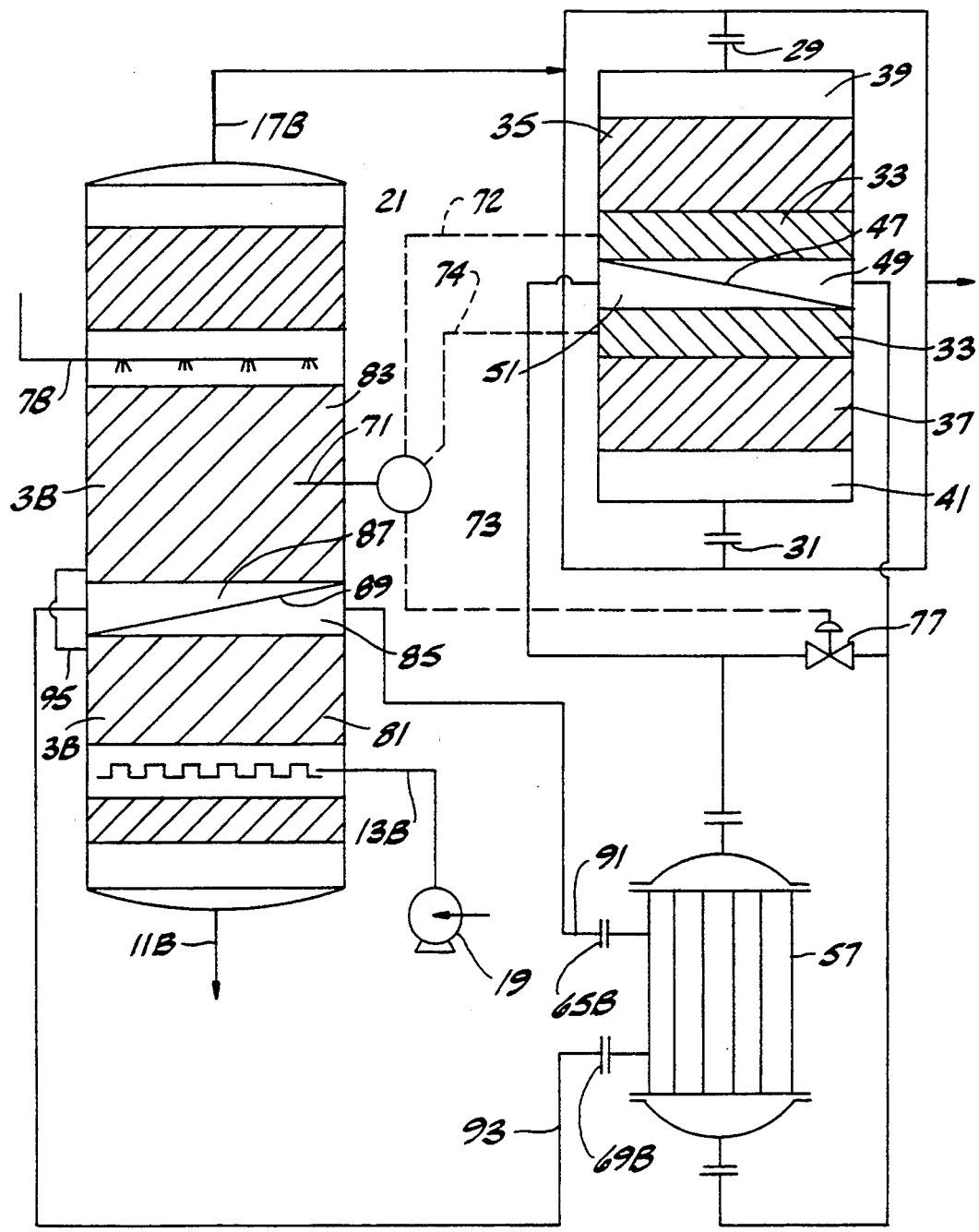
FIG. 3 is a flow sheet showing the process of the invention carried out in a stripper in which the stripping gas withdrawn from the gas/liquid contact zone is heated by transfer of heat from combustion gas and then returned to the contact zone for further stripping of organic contaminant from the aqueous stream.

FIG. 3 illustrates a further preferred embodiment of the apparatus and process of FIG. 1, in which the liquid contact zone 3B in tower 1 is divided into a cold gas stripping zone 81 at the bottom of the tower and a hot gas stripping zone 83 above zone 81. Each of zones 81 and 83 comprises means for promoting gas/liquid mass transfer, such as rings, saddles or the like. The stripping gas inlet 13B and the liquid outlet 11B for stripped liquid are positioned for introducing the stripping gas into and discharging stripped liquid from the bottom of cold gas stripping zone 81. Liquid inlet 7B and effluent gas outlet 17B are positioned for introducing the stripping gas into and discharging the effluent gas from the top of hot gas stripping zone 83. Between zones 81 and 83 are a stripping gas withdrawal zone 85, positioned immediately above zone 81, and a stripping gas return zone 87, positioned immediately below zone 83. The withdrawal and return zones are separated by a partition 89. Withdrawal zone 85 is in gas flow communication with an inlet 65B to the shell side of exchanger 57 through a gas line 91 and an outlet 69B from the shell side of the exchanger is in gas flow communication with return zone 87 through a gas line 93. A liquid by pass line 95 provides liquid flow communication between the hot and cold gas stripping zones.

In operation of the system of FIG. 3, liquid introduced through inlet 7B and gas introduced through inlet 13B flow countercurrently through both the cold gas and hot gas stripping zones. Stripping gas is removed from the liquid contact zone by passage through withdrawal zone 85 and gas line 91, and is passed through the shell side of heat exchanger 57 where it is heated by transfer of heat from reaction gas that has been removed from the regenerative heat transfer reaction system. Liquid flowing down through hot gas stripping zone 83 is heated, thus increasing the equilibrium partial pressure of the volatile component of the liquid stream and promoting mass transfer of the volatile component to the hot stripping gas. Effluent gas exiting zone 83 passes through mist eliminator 21 and thence through gas line 23 to the regenerative heat transfer reaction system. Liquid exiting the bottom of hot gas stripping zone 83 flows through by pass line 95 into the upper portion of cold gas stripping zone 81, where it flows downward countercurrently to cold stripping gas introduced into the bottom of the tower via inlet 13B.

Countercurrent flow in cold gas zone 81 is effective to transfer heat from the liquid stream to the gas stream, minimizing the energy lost from the system in the stripped liquid leaving the bottom of the fluid contact zone. Where other conditions are essentially the same, transfer of heat to the gas in zone 81 allows the gas to be heated to a higher temperature in heat exchanger 57 in the process of FIG. 3 than in the process of FIG. 1. This further promotes transfer of the volatile component to the hot stripping gas in zone 83.

While all of the embodiments illustrated in FIGS. 1–3 include an indirect heat exchanger external to the stripper and the regenerative heat transfer reaction system, it will be understood that heat may be transferred to the fluid contact zone of the stripper by means of a coil or other indirect heat transfer device located in the contact zone. In a further alternative, the stripping gas or liquid stream entering the contact zone may be passed through a coil or other indirect heat transfer means within the reaction zone or reaction heat recovery zone of the regenerative heat transfer reaction system. The latter arrangement may be substituted in a system otherwise essentially identical to that of either FIGS. 1 to 3.

Figure 4:
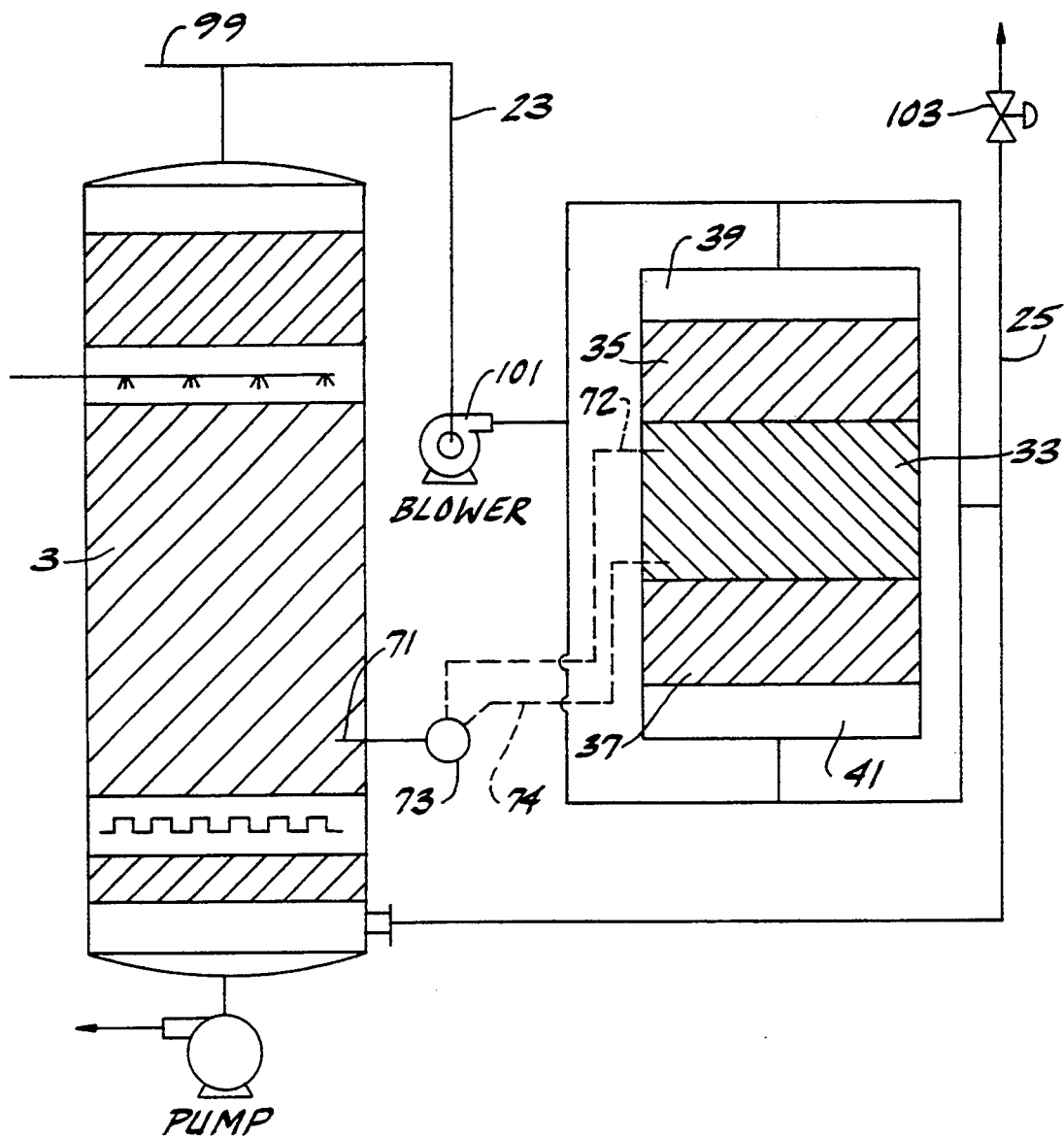
FIG. 4 is a flow sheet showing a system in which combustion gas is used as the stripping gas and heat is transferred to the aqueous stream in the stripping zone by direct contact heat transfer from the combustion gas.

FIG. 4 illustrates a further alternative embodiment of the invention in which a portion of the combustion gas is recirculated through the stripper and serves as the stripping gas. Thus, fluid contact zone 3 is heated by direct contact heat transfer from the stripping gas to the aqueous stream in the contact zone. Combustion air or oxygen is introduced through a makeup line 99 into the effluent gas from the stripper in line 23. A blower 101 in line 23 downstream of makeup line 99 circulates gas within the system and draws air in through line 99. Combustion products are removed from the circulating stream through a valve 103 in gas circuit 25 at a rate equivalent to the rates of introduction of the volatile organic component (and water vapor) into the stripping gas and of oxygen into the effluent gas. Air is drawn in through line 99 to balance combustion products removed through valve 103.

Preferably, the system is operated with a modest excess of oxygen in the reaction zone. If desired, the addition of air or oxygen may be controlled in response to the oxygen content measured in the recirculating gas stream. In this case, combustion gas is released from the system to balance the rate of introduction of air or oxygen; and the rate of combustion gas release may be controlled, for example, by a pressure regulator. However, many systems can be effectively controlled by simply withdrawing combustion gas at a controlled rate through valve 103, and allowing air to be drawn to balance the combustion gas that is released. In fact, it may often be feasible to substitute an orifice or other fixed flow restriction for valve 103.

Because the rate of recirculation is driven by the material balance, temperature may be controlled by controlling the addition of supplemental fuel in the case wherein the organic contaminant content of the effluent gas is insufficient to supply the heat necessary to preheat that gas to combustion temperature. Where the organic contaminant content is high enough to supply excess heat, temperature in the combustion chamber may be controlled by recovery of high potential heat from the combustion gas before it is circulated through the fluid contact zone.

In operation of the process illustrated in FIG. 4, the recirculation rate is at least several times the rate at which combustion gas is released from and air introduced into the circulating stream. Where ambient air is used for combustion, the G/L mass flow ratio in the stripper is typically in the range of between about 1 and about 3. However, the net ratio of makeup air flow to liquid flow may range as low as 0.01, and as high as 10. In many operations, the weight ratio of net makeup air to liquid is in the range of about 0.1 to about 0.5. The met volume of gas introduced and released may be further reduced by introducing pure oxygen or oxygen enriched air into the circulating stream via makeup line 99.

The system of FIG. 4 is very sensitive to the volatile organic contaminant content of the aqueous liquid introduced into the stripper. Upon combustion, each gram of hydrocarbon per kg. of water provides sufficient heat for an adiabatic temperature rise of about 11° C. in the water. This theoretical temperature increase is decreased to only a very minor extent by the heat which escapes from the stripping zone in the effluent stripping gas. For example, if the contaminated aqueous stream contains 0.5% (about 5 gpl) of organics, the heat generation is sufficient to heat the water to about 56° C. under adiabatic conditions. If the effluent gas leaves the stripping zone at 95° C., the aqueous stream is heated to a temperature only 1° to 2° C. lower than 56° C.

In the process illustrated in FIG. 4, a substantial fraction of the cooled combustion gas exiting the heat recovery zone is recirculated through the stripper, and the entire stripping gas stream is advantageously constituted of this recirculated combustion gas. In a modification of the process of FIG. 4, a minor fraction of substantially uncooled combustion gas is taken either directly from the combustion zone, or from the interface between the combustion zone and the heat recovery zone, and used to directly supply heat to the fluid contact zone. In this embodiment, the bulk of the stripping gas, preferably air, is admitted to the bottom of the stripper as in FIG. 1, and the recycled combustion gas is mixed with this air below the stripping zone to produce a heated gas mixture that is effective for stripping. In this instance, the air entering through the bottom of the stripper provides a source of oxygen for the combustion, and there is no need to bleed in air or oxygen downstream of the stripper, as per line 99 of FIG. 4. The rate at which combustion gas is removed for recycle to the fluid contact zone may be controlled in response to either the temperature of that zone or the temperature of the reaction zone.

In a further alternative, a fraction of substantially uncooled combustion gas may be introduced directly into the hot gas stripping zone of a liquid stripping system of the type illustrated in FIG. 3. The bulk of the stripping gas, preferably air which supplies the oxygen for combustion, is introduced into the cold gas stripping zone and mixes with the recycled combustion gas in the hot gas stripping zone to produce a heated stripping gas for enhanced removal of volatile components from the liquid flowing through the hot gas zone. Alternatively, all or a fraction of the stripping gas may be removed from the fluid contact zone at the gas exit of the cold gas zone, and mixed in a separate mixing vessel with the recycled combustion gas to produce a heated stripping gas that is then introduced into the hot gas stripping zone.

Apparatus for recycling substantially uncooled reaction gas to the fluid contact zone includes means for fluid flow communication comprising, for example, a gas line between the inlet of the contact zone and the combustion zone, or between the contact zone inlet and the interfaces between the combustion zones and the heat exchange zones. For application to a system of the type otherwise illustrated in FIG. 3, the gas line extends to the inlet of the hot gas stripping zone, or to a mixer in which the substantially uncooled combustion gas is mixed with gas withdrawn from the exit of the cold gas stripping zone. Gas lines comparable to those illustrated in FIG. 3 provide for flow of stripping gas to the mixer from the exit of the cold gas zone, and for flow of heated stripping gas from the mixer to the inlet of the hot gas zone. In this circuit, the mixer essentially replaces the indirect heat exchanger shown in the drawing.

Although illustrated in combination with a regenerative heat transfer reaction system, the process of the invention may used advantageously in combination with other systems for combustion of the volatile organic (or other reaction between a volatile component and an active component of the effluent gas from the stripper). The use of a regenerative heat transfer reaction system is highly preferred, particularly where the reaction zone contains a catalyst for the reaction which allows the reaction to be conducted at moderate temperatures in the range of 300° to 700° C. Such systems provide highly effective energy recovery in the reaction system, independently of the preferred system in which reaction heat is transferred to the fluid contact zone of the stripper to promote mass transfer at that step, though use of the preferred system is essential to the improved operation of the stripper itself.

EXAMPLE

Water contaminated with benzene (5 g/kg) is introduced at a rate of 100 kg/hr into the stripper of an apparatus of the type illustrated in FIG. 4. Effluent gas from the stripper is introduced into the regenerative heat transfer reaction system where the benzene is burned with oxygen in the effluent gas. A portion of the combustion gas exits the system through valve 103 and the remainder is recirculated through the stripper at a rate such that the G/L mass flow ratio in the stripper is about 1.5. Combustion gas is released through valve 103 and air is drawn into the system through line 99 at such rates that the mass flow ratio of net air intake to liquid flow rate is about 0.36.

The temperature of the water entering the stripper is 20° C. Accounting for heat losses from the system, water exiting the stripper is heated to a temperature of 68° C. and has a benzene content of 0.005 g/kg. Effluent gas leaves the system at a temperature of about 100° C.

What is claimed is:

1. A process for removing a volatile component from a liquid stream comprising:

contacting said liquid stream in a fluid contact zone with a stripping gas, thereby stripping said volatile component from said liquid stream and producing an effluent gas stream containing a vapor comprising said volatile component;

introducing a reactant gas feed stream comprising said effluent gas stream into a reaction zone; and in said reaction zone, reacting said volatile component and an active component that is exothermically reactive with said volatile component in the gas phase to produce a reaction gas stream, said reaction zone comprising the reaction zone of a regenerative heat transfer reaction system in which heat is recovered by regenerative heat exchange and used to heat said reactant gas feed stream before it enters the reaction zone, said system comprising said reaction zone and at least two regenerative heat exchange zones, in one of said regenerative heat exchange zones, comprising a heat recovery zone, the reaction gas stream exiting the reaction zone being passed over a heat storage material which absorbs heat transferred from the reaction gas stream, and in the other of said heat exchange zones, comprising a preheating zone, said reactant gas feed stream being passed over a heat storage material from which stored heat is transferred to said reactant gas feed stream before it enters the reaction zone, the flow of gas being periodically reversed through a continuing series of cycles so that heat that has been absorbed from the reaction gas stream is used to preheat the reactant gas feed stream entering the reaction zone; characterized in that:

heat is transferred from said reaction gas stream to said fluid contact zone by indirect heat transfer from said reaction gas stream to said stripping gas, the transfer of heat to said fluid contact zone being effective to increase the equilibrium partial pressure of said volatile component in the gas phase in said fluid contact zone and thereby increase the driving force for mass transfer of said volatile component from said liquid stream to said stripping gas.

2. A process for removing a volatile organic component from an aqueous stream comprising: contacting said aqueous stream in a fluid contact zone with a stripping gas, thereby stripping said volatile component from said aqueous stream and producing an effluent gas stream containing a vapor comprising said volatile component; introducing a reactant gas feed stream comprising said effluent gas stream into a reaction zone; and in said reaction zone, reacting said volatile component with oxygen in the gas phase to produce a combustion gas, said reaction zone comprising the reaction zone of a regenerative heat transfer combustion system in which heat is recovered by regenerative heat exchange and used to heat said reactant gas feed stream before it enters the reaction zone, said system comprising said reaction zone and at least two regenerative heat exchange zones, in one of said regenerative heat exchange zones, comprising a heat recovery zone, the combustion gas stream exiting the reaction zone being passed over a heat storage material which absorbs heat transferred from the combustion gas stream, and in the other of said heat exchange zones, comprising a preheating zone, said reactant gas feed stream being passed over a heat storage material from which stored heat is transferred to said reactant gas feed stream before it enters the reaction zone, the flow of gas being periodically reversed through a continuing series of cycles so that heat that has been absorbed from the combustion gas stream is used to preheat the reactant gas feed stream entering the reaction zone; characterized in that: heat is transferred from said combustion gas to said fluid contact zone by indirect heat transfer from said combustion gas stream to said strapping gas, the transfer of heat to said fluid contact zone being effective to increase the equilibrium partial pressure of said volatile component in the gas phase in said fluid contact zone and thereby increase the driving force for mass transfer of said volatile component from said aqueous stream to said stripping gas.

3. A process for removing a volatile component from a liquid stream comprising:
  contacting said liquid stream in a fluid contact zone with a stripping gas, thereby stripping said volatile component from said liquid stream and producing an effluent gas stream containing a vapor comprising said volatile component;
  introducing a reactant gas feed stream comprising said effluent gas stream into a reaction zone; and
  in said reaction zone, reacting said volatile component and an active component that is exothermically reactive with said volatile component in the gas phase to produce a reaction gas stream, said reaction zone comprising the reaction zone of a regenerative heat transfer reaction system in which heat is recovered by regenerative heat exchange and used to heat said reactant gas feed stream before it enters the reaction zone, said system comprising said reaction zone and at least two regenerative heat exchange zones, in one of said regenerative heat exchange zones, comprising a heat recovery zone, the reaction gas stream exiting the reaction zone being passed over a heat storage material which absorbs heat transferred from the reaction gas stream, and in the other of said heat exchange zones, comprising a preheating zone, said reactant gas feed stream being passed over a heat storage material from which stored heat is transferred to said reactant gas feed stream before it enters the reaction zone, the flow of gas being periodically reversed through a continuing series of cycles so that heat that has been absorbed from the reaction gas stream is used to preheat the reactant gas feed stream entering the reaction zone; characterized in that:
  heat is transferred from said reaction gas stream to said fluid contact zone by indirect heat transfer from said reaction gas stream to said liquid stream, the transfer of heat to said fluid contact zone being effective to increase the equilibrium partial pressure of said volatile component in the gas phase in said fluid contact zone and thereby increase the driving force for mass transfer of said volatile component from said liquid stream to said stripping gas.

4. A process for removing a volatile organic component from an aqueous stream comprising:
  contacting said aqueous stream in a fluid contact zone with a stripping gas, thereby stripping said volatile component from said aqueous stream and producing an effluent gas stream containing a vapor comprising said volatile component;
  introducing a reactant gas feed stream comprising said effluent gas stream into a reaction zone; and
  in said reaction zone, reacting said volatile component with oxygen in the gas phase to produce a combustion gas, said reaction zone comprising the reaction zone of a regenerative heat transfer combustion system in which heat is recovered by regenerative heat exchange and used to heat said reactant gas feed stream before it enters the reaction zone, said system comprising said reaction zone and at least two regenerative heat exchange zones, in one of said regenerative heat exchange zones, comprising a heat recovery zone, the combustion gas stream exiting the reaction zone being passed over a heat storage material which absorbs heat transferred from the combustion gas stream, and in the other of said heat exchange zones, comprising a preheating zone, said reactant gas feed stream being passed over a heat storage material from which stored heat is transferred to said reactant gas feed stream before it enters the reaction zone, the flow of gas being periodically reversed through a continuing series of cycles so that heat that has been absorbed from the combustion gas stream is used to preheat the reactant gas feed stream entering the reaction zone; characterized in that:
  heat is transferred from said combustion gas stream to said fluid contact zone by indirect heat transfer from said combustion gas stream to said aqueous stream, the transfer of heat to said fluid contact zone being effective to increase the equilibrium partial pressure of said volatile component in the gas phase in said fluid contact zone and thereby increase the driving force for mass transfer of said volatile component from said aqueous stream to said stripping gas.

5. A process for removing a volatile component from a liquid stream comprising:
  contacting said liquid stream in a fluid contact zone with a stripping gas, thereby stripping said volatile component from said liquid stream and producing an effluent gas stream containing a vapor comprising said volatile component;
  introducing a reactant gas feed stream comprising said effluent gas stream into a reaction zone; and
  in said reaction zone, reacting said volatile component and an active component that is exothermically reactive with said volatile component in the gas phase to produce a reaction gas stream, said reaction zone comprising the reaction zone of a regenerative heat transfer reaction system in which heat is recovered by regenerative heat exchange and used to heat said reactant gas feed stream before it enters the reaction zone, said system comprising said reaction zone and at least two regenerative heat exchange zones, in one of said regenerative heat exchange zones, comprising a heat recovery zone, the reaction gas stream exiting the reaction zone being passed over a heat storage material which absorbs heat transferred from the reaction gas stream, and in the other of said heat exchange zones, comprising a preheating zone, said reactant gas feed stream being passed over a heat storage material from which stored heat is transferred to said reactant gas feed stream before it enters the reaction zone, the flow of gas being periodically reversed through a continuing series of cycles so that heat that has been absorbed from the reaction gas stream is used to preheat the reactant gas feed stream entering the reaction zone; characterized in that:
  a hot stream of reaction gas is removed from said regenerative heat transfer reaction system and passed through an indirect heat exchanger in which heat is transferred from said hot stream of reaction gas to a fluid stream comprising said liquid stream or said stripping gas to thereby transfer heat from said hot stream of reaction gas to said fluid contact zone, the transfer of heat to said fluid contact zone being effective to increase the equilibrium partial pressure of said volatile component in the gas phase in said fluid contact zone and thereby increase the driving force for mass transfer of said volatile component from said liquid stream to said stripping gas.

6. A process as set forth in claim 5 wherein said liquid stream and said stripping gas are passed countercurrently through said fluid contact zone, said fluid contact zone comprising a cold gas stripping zone and a hot gas stripping zone, the stripping gas entering said fluid contact zone at a gas inlet of the cold gas stripping zone and the effluent gas exiting said fluid contact zone at a gas exit of the hot gas stripping zone, the liquid stream entering the fluid contact zone at a liquid inlet of the hot gas stripping zone and exiting the fluid contact zone at a liquid exit of the cold gas stripping zone, stripping gas exiting said cold gas stripping zone being passed through said indirect heat exchanger where it is heated by transfer of heat from said reaction gas stream, stripping gas exiting said indirect heat exchanger being introduced into said hot gas stripping zone.

7. A process as set forth in claim 6 wherein the stripping gas exiting said cold gas stripping zone is removed from said fluid contact zone for passage through said indirect heat exchanger, and the stripping gas exiting said heat exchanger is returned to said fluid contact zone for introduction into said hot gas stripping zone.

8. A process as set forth in claim 5 wherein the stream of reaction gas exiting said indirect heat exchanger is returned to said regenerative heat transfer reaction system for further recovery of heat therefrom in said one regenerative heat exchange zone.

9. A process as set forth in claim 8 wherein said stream of reaction gas exiting said indirect heat exchanger is returned to said reaction zone for further reaction between said volatile component and said active component before the gas stream of reaction enters said one regenerative heat exchange zone.

10. A process as set forth in claim 9 wherein the rate of heat transfer to said fluid contact zone is regulated to control the temperature of said reaction zone, temperature control being effected by removing said hot stream of reaction gas from said regenerative heat transfer reaction system at a flow rate greater than that required for transfer of heat at the regulated heat transfer rate, measuring the temperature in said reaction zone, bypassing a portion of said removed hot stream of reaction gas around said indirect heat exchanger, and passing the remainder of said removed hot stream of reaction gas through said heat exchanger, the portion bypassed being regulated in response to the measured temperature to maintain the measured temperature at a desired value.

11. A process as set forth in claim 9 wherein the rate of heat transfer to said fluid contact zone is regulated by controlling the temperature of said fluid contact zone or of the fluid stream that is heated by transfer of heat from said hot reaction gas stream in said indirect heat exchanger, temperature control being effected by removing said hot stream of reaction gas from said regenerative heat transfer reaction system at a flow rate greater than that required for transfer of heat at the regulated heat transfer rate, measuring the temperature to be controlled, and bypassing a portion of said removed hot stream of reaction gas around said indirect heat exchanger, and passing the remainder of said removed hot stream of reaction gas through said heat exchanger, the portion bypassed being regulated in response to the measured temperature to maintain the measured temperature at a desired value.

12. A process as set forth in claim 11 wherein said bypassed portion is returned to said regenerative heat transfer reaction system for further recovery of heat therefrom in said one regenerative heat exchange zone.

13. A process as set forth in claim 11 wherein additional heat is recovered from said reaction gas in the form of high potential energy.

14. A process for removing a volatile component from a liquid stream comprising:

contacting said liquid stream in a fluid contact zone with a stripping gas, thereby stripping said component from said liquid stream and producing an effluent gas stream containing a vapor comprising said volatile component;

introducing a reactant gas feed stream comprising said effluent gas stream into a reaction zone; and in said reaction zone, reacting said volatile component and an active component that is exothermically reactive with said volatile component in the gas phase to produce a reaction gas stream, said reaction zone comprising the reaction zone of a regenerative heat transfer reaction system in which heat is recovered by regenerative heat exchange and used to heat said reactant gas feed stream before it enters the reaction zone, said system comprising said reaction zone and at least two regenerative heat exchange zones, in one of said regenerative heat exchange zones, comprising a heat recovery zone, the reaction gas stream exiting the reaction zone being passed over a heat storage material which absorbs heat transferred from the reaction gas stream, and in the other of said heat exchange zones, comprising a preheating zone, said reactant gas feed stream being passed over a heat storage material from which stored heat is transferred to said reactant gas feed stream before it enters the reaction zone, the flow of gas being periodically reversed through a continuing series of cycles so that heat that has been absorbed from the reaction gas stream is used to preheat the reactant gas feed stream entering the reaction zone; characterized in that:

heat is transferred directly from said reaction gas to said fluid contact zone by introducing a portion of said reaction gas stream into said fluid contact zone, said stripping gas comprising said portion of said reaction gas stream introduced into said fluid contact zone, the transfer of heat to said fluid contact zone being effective to increase the equilibrium partial pressure of said volatile component in the gas phase in said fluid contact zone and thereby increase the driving force for mass transfer of said volatile component from said liquid stream to said stripping gas.

15. A process as set forth in claim 14 wherein said active component is introduced into said reactant gas feed stream before said reactant gas feed stream is introduced into said reaction zone.

16. A process as set forth in claim 15 wherein said portion of said reaction gas stream introduced into said fluid contact zone is recirculated between said fluid contact zone and said regenerative heat transfer reaction system, the remainder of said reaction gas stream being removed from the circulating stream at a rate equivalent to the rates of introduction of volatile component into said stripping gas and of said active component into said reactant gas feed stream.

17. A process as set forth in claim 14 wherein a portion of the reaction gas stream exiting said heat recovery zone is recirculated to said fluid contact zone.

18. A process as set forth in claim 17 wherein a portion of substantially uncooled reaction gas is removed from said reaction zone or from an interface between said reaction zone and said heat recovery zone, and said substantially uncooled reaction gas is recirculated to said fluid contact zone for direct heat transfer to said fluid contact zone.

19. A process as set forth in claim 18 wherein the stripping gas comprises a mixture of said portion of substantially uncooled reaction gas and a gas containing an active component that reacts with said volatile component in said reaction zone.

20. A process as set forth in claim 18 wherein said liquid stream and said stripping gas are passed countercurrently through said fluid contact zone, said fluid contact zone comprising a cold gas stripping zone and a hot gas stripping zone, stripping gas entering said fluid contact zone at a gas inlet of the cold gas stripping zone and the effluent gas exiting said fluid contact zone at a gas exit of the hot gas stripping zone, the liquid stream entering the fluid contact zone at a liquid inlet of the hot gas stripping zone and exiting the fluid contact zone at a liquid exit of the cold gas stripping zone, a heated stripping gas being passed through said hot gas stripping zone, said heated stripping gas being produced by mixing said portion of substantially uncooled reaction gas and stripping gas exiting said cold gas stripping zone.

* * * * *